(12) United States Patent
Parpinello et al.

(10) Patent No.: US 11,865,510 B2
(45) Date of Patent: Jan. 9, 2024

(54) DEVICE AND METHOD FOR STABILIZING WINE AND OTHER VEGETABLE BEVERAGES

(71) Applicant: ALMA MATER STUDIORUM-UNIVERSITA' DI BOLOGNA, Bologna (IT)

(72) Inventors: Giuseppina Paola Parpinello, Faenza (IT); Andrea Versari, Faenza (IT); Luigi Ragni, Cesena (IT); Arianna Ricci, San Giustino (IT); Marina Serantoni, Casola Valsenio (IT); Andrea Balducci, Monsummano Terme (IT)

(73) Assignee: ALMA MATER STUDIORUM-UNIVERSITA'DI BOLOGNA, Bologna (IT)

( * ) Notice: Subject to any disclaimer, the term of this patent is extended or adjusted under 35 U.S.C. 154(b) by 645 days.

(21) Appl. No.: 17/047,753

(22) PCT Filed: Apr. 16, 2019

(86) PCT No.: PCT/IB2019/053102
§ 371 (c)(1),
(2) Date: Oct. 15, 2020

(87) PCT Pub. No.: WO2019/202480
PCT Pub. Date: Oct. 24, 2019

(65) Prior Publication Data
US 2021/0162367 A1  Jun. 3, 2021

(30) Foreign Application Priority Data
Apr. 19, 2018  (IT) .................... 102018000004721

(51) Int. Cl.
B01J 20/06 (2006.01)
A23L 2/80 (2006.01)
B01D 15/20 (2006.01)
B01D 15/22 (2006.01)
B01J 20/28 (2006.01)
B01J 20/282 (2006.01)
(Continued)

(52) U.S. Cl.
CPC ................. B01J 20/06 (2013.01); A23L 2/80 (2013.01); B01D 15/203 (2013.01);
(Continued)

(58) Field of Classification Search
CPC ............ A23V 2300/02; A23V 2300/34; A23V 2300/14; B01J 20/28083; B01J 20/28069;
(Continued)

(56) References Cited

U.S. PATENT DOCUMENTS 3,878,310 A  4/1975  Field et al.
4,684,530 A  8/1987  Welsh et al.
(Continued)

FOREIGN PATENT DOCUMENTS

CN  107185493 A  9/2017
EP  0118990 A3  9/1984
(Continued)

OTHER PUBLICATIONS

International Search Report, issued in PCT/IB2019/053102, dated Jul. 8, 2019, Rijswijk, Netherlands.
(Continued)

*Primary Examiner* — Hong T Yoo
(74) *Attorney, Agent, or Firm* — Ferguson Case Orr Paterson

(57) ABSTRACT

A device and a method for stabilizing wine or other vegetable beverages by removal, in whole or in part, of agents responsible for instability, including proteins and metals, are provided. The device has a tubular container filled internally at least partly with particles of support material covered with a layer of a mesoporous nanostructured adsorbent material comprising titanium oxide, adapted to absorb proteins and metals.

10 Claims, 4 Drawing Sheets

(51) Int. Cl.
*B01J 20/34* (2006.01)
*C12H 1/044* (2006.01)

(52) U.S. Cl.
CPC .......... *B01D 15/206* (2013.01); *B01D 15/22* (2013.01); *B01J 20/282* (2013.01); *B01J 20/28021* (2013.01); *B01J 20/28052* (2013.01); *B01J 20/28059* (2013.01); *B01J 20/28061* (2013.01); *B01J 20/28071* (2013.01); *B01J 20/28073* (2013.01); *B01J 20/28083* (2013.01); *B01J 20/3433* (2013.01); *B01J 20/3475* (2013.01); *C12H 1/0408* (2013.01); *A23V 2002/00* (2013.01); *B01J 2220/52* (2013.01)

(58) Field of Classification Search
CPC ....... B01J 20/06; B01J 20/28057; C12H 1/04; C12H 1/0408
See application file for complete search history.

(56) References Cited

U.S. PATENT DOCUMENTS

| | | |
|---|---|---|
| 2002/0094364 A1 | 7/2002 | Hu et al. |
| 2006/0144793 A1 | 7/2006 | Dadachov |
| 2007/0231249 A1 | 10/2007 | Batllo et al. |

FOREIGN PATENT DOCUMENTS

| | | |
|---|---|---|
| EP | 0124685 A2 | 11/1984 |
| GB | 1513195 A | 6/1978 |
| WO | 9315832 A1 | 8/1993 |
| WO | 201019312 A1 | 2/2010 |

OTHER PUBLICATIONS

Written Opinion, issued in PCT/IB2019/053102; dated Jul. 8, 2019.

DEVICE AND METHOD FOR STABILIZING WINE AND OTHER VEGETABLE BEVERAGES

CROSS-REFERENCE TO RELATED APPLICATIONS

This application is a National Phase Application of PCT International Application No. PCT/IB2019/053102, having an International Filing Date of Apr. 16, 2019 which claims the benefit of priority to Italian Patent Application No. 102018000004721, filed Apr. 19, 2018, each of which is hereby incorporated by reference in its entirety.

FIELD OF THE INVENTION

The present invention concerns a device for the stabilization of wine and other vegetable beverages and the stabilization method thereof. More specifically, the invention concerns a device and a method adapted to remove from wine, beer and other vegetable beverages such as fruit juices, agents responsible for instability, such as proteins and metals.

BACKGROUND OF THE INVENTION

The international patent application WO201019312 describes a method for reducing turbidity in a liquid containing proteins, which comprises bringing the liquid into contact with an aqueous dispersion of silica microgels with an average diameter of at least 18 nm.

The international patent application WO201019312 describes a method to reduce instability in a liquid containing proteins, which comprises bringing the liquid into contact with an aqueous dispersion of silica microgels with an average diameter of at least 18 nm.

The Chinese patent application CN107185493 describes the preparation of composite mesoporous carbon microspheres used to purify air, but also teaches that these spheres may be used in oenology as liquid phase adsorbents.

U.S. Pat. No. 3,878,310 describes a method for clarifying beverages such as wine, beer and fruit juices, which comprises placing beverages in contact with water-insoluble and water-swellable polymers, such as crosslinked N-vinyl-lactam and N-alkyl-vinylamide in the form of porous granules or beads.

U.S. Pat. No. 3,878,310 describes a method for the pre-clarification of wines, beers and fruit juices by removing tannins using insolubilized PVP (polyvinylpyrrolidone).

The aforesaid methods of the prior art, as well as others using bentonite or gelatin as adsorbent agents, are carried out in static mode, which means that the adsorbent agents must be removed at the end of the treatment, through decanting and filtration. Once removed, the adsorbent agents may generally not be reused and thus generate a large amount of waste that must be disposed of. Static-mode stabilization treatments may also require a relatively long time, even up to a week.

The European patent application EP0118990 describes a method for stabilizing wine by using tannic acid or a phenolic compound immobilized on a column. However, this method is only applicable for the prevention of generic instability presumably generated by proteins (which cause turbidity), while the aspects of inhibition of oxidative phenomena and color stabilization achievable through the removal of specific metal oxidation catalysts (mainly Fe, Cu, Mn) are not considered.

SUMMARY OF THE INVENTION

Drawbacks of the prior art are overcome by a device and a method for stabilizing wine and other vegetable beverages, including beer and fruit juices, as described and claimed herein.

The device according to the invention is preferably a continuous flow device. "Continuous flow device" means a device capable of operating at a constant flow rate, avoiding the phenomenon of clogging.

Hereinafter is a detailed description of the device for stabilizing wine and other vegetable beverages according to the invention, as well as the stabilization method thereof, which constitutes a second aspect of the invention.

In the following, wine or other vegetable beverage subjected to stabilization by means of the device of the invention is referred to for brevity as "the beverage".

DETAILED DESCRIPTION

Figure 1A:
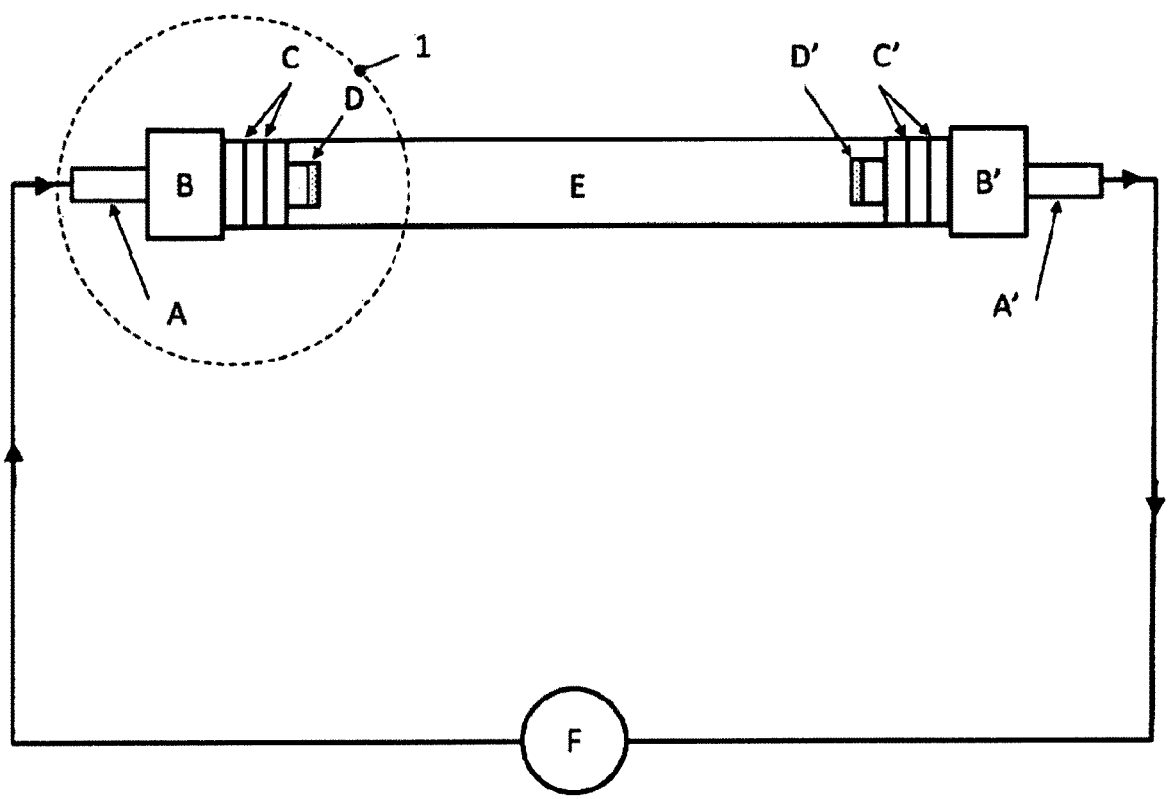
FIG. 1A is a schematic representation of a first embodiment of the device according to the present invention.
Figure 1B:
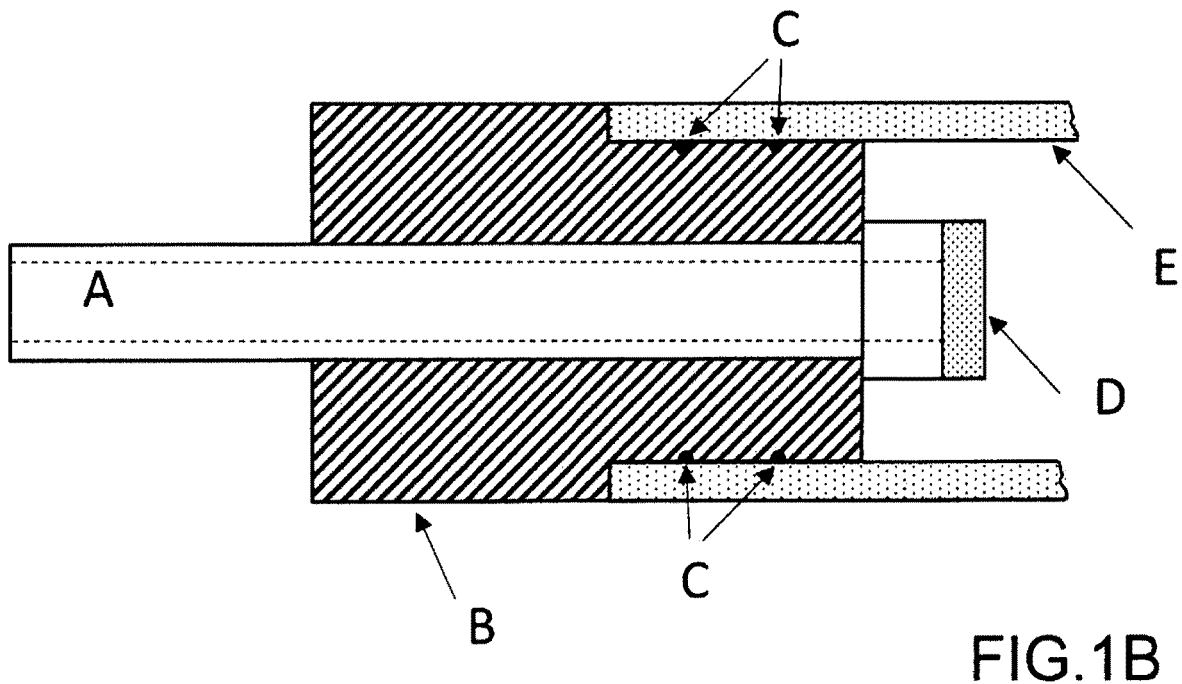
FIG. 1B is a schematic representation in lateral cross-section of a detail of FIG. 1A.

The device illustrated in FIGS. 1A and 1B comprises a tubular container (E) made of an inert material filled internally at least partly with particles made of a support material coated with a layer of mesoporous nanostructured adsorbent material comprising titanium oxide, the aforesaid layer having a thickness of between 10 and 25 µm and the aforesaid mesoporous nanostructured adsorbent material having pores of sizes between 15 and 50 nm, surface area (BET) between 90 and 100 $m^2/g$ and absorbent volume of the pores between 0.4 and 0.5 $cm^3/g$.

The particle size is preferably between 1 and 10 mm.

Suitable inert materials for the construction of the tubular container (E) are, for example, stainless steel, glass or food-grade plastics. The particles of inert material on which the mesoporous nanostructured adsorbent material is supported are, for example, composed of glass spheres or flakes.

In the following description, the mesoporous nanostructured adsorbent material supported on the particles of inert material will at times be referred to as "adsorbent material" for brevity.

This adsorbent material is produced from nanometer-sized nanoparticles of titanium dioxide (for example, particles of 15 to 100 nm in diameter), dispersed in an appropriate solvent (e.g. terpineol) and supported on an organic matrix (for example ethyl cellulose). The concentration of nanoparticles on the organic matrix is appropriately about 15-25% by weight. The product, which looks like a paste, is applied to glass surfaces, properly treated or on which thin intermediate layers have been applied previously, using the "doctor blade" method known per se, which consists of the deposition and application of the paste on the support with the help of glass rods. This method allows thin films of mesoporous material to be obtained characterized by thicknesses on the order of tens of µm. The subsequent sintering method, conducted, for example, in a ventilated furnace with controlled temperature increase up to values between 500 and 600° C., allows the progressive degradation of the organic component and the removal thereof. The resulting structural organization of the nanoparticles and the formation of melting points between the same particles (technically referred to as "sintering necks") and between the particles and the glass support gives rise to a compact layer of mesoporous material (order of magnitude of the pores: 15-50 nm). The following characteristics have been identified for the mesoporous layer obtained after sintering (range of values observed by applying the "doctor blade" deposition method): thickness=10-25 µm, surface area (BET)=90-100 $m^2/g$ and absorbent volume of the pores=0.40-0.50 $cm^3/g$.

The device illustrated in FIGS. 1A and 1B also comprises, at the two ends of the tubular container (E), respectively an inlet conduit (A) and an outlet conduit (A') for the beverage to be treated, in fluid communication with the internal volume of the tubular container (E). Appropriately, the inlet conduit (A) and the outlet conduit (A') allow the device to operate continuously.

At the two ends of the tubular container (E) there are also first and second closure elements (B and B'), adapted to occlude the respective end sections of the same container and prevent the release of the adsorbent material contained therein. The two conduits (A and A') pass through these closure elements (B and B'). The closure elements (B and B') may, for example, be of the ferrule or flange type tightened by bolts; in general, they may be of any type known per se.

In the outlet section of the inlet conduit (A) into the tubular container (E), there is positioned a filtering element (D), such as a mesh filter, with pores having dimensions adapted to retain the particles of adsorbent material inside the container. A similar filter element (D') is placed in the inlet section of the outlet conduit (A') from the tubular container (E).

In the present description, "outlet section" means the inlet section of the fluid from the inlet conduit (A) into the tubular container (A). "Inlet section" means the inlet section of the flow from the tubular container (A) to the outlet conduit (A').

In the embodiment illustrated in FIGS. 1A and 1B, there are further respective sealing gaskets (C and C') applied to the interface between the tubular container (E) and the closure elements (B and B'). The sealing gaskets (C and C') are, for example, O-rings.

Finally, according to one embodiment, the two conduits (A and A') are mutually connected in a closed loop. Appropriately, the circulation of the beverage within this closed loop occurs by means of a pump (G) known per se, having dimensions that one skilled in the art is able to define based on the volumes of beverage to be treated and the expected flow rate.

The method for stabilizing wine and other vegetable beverages according to the present invention is based on the adsorption, and thus the removal, of proteins and/or metals from the wine. The method comprises at least one adsorption step wherein the wine or other vegetable beverage containing proteins and/or metals, which are the agents responsible for the instability of the beverage, is made to flow through the device described above in order to obtain the adsorption of the aforesaid agents responsible for instability on the adsorbent material contained in the device and, consequently, their total or partial removal from the beverage.

Optionally, the method of the invention comprises one or more further adsorption steps, wherein the wine or other vegetable beverage is recirculated through the device, so as to obtain greater adsorption of the agents responsible for instability on the adsorbent material contained in the device.

In one embodiment, the stabilization method of the present invention further comprises a step of washing the adsorbent material, which is carried out at the end of one or more cycles of adsorption or in an intermediate step of the method if the method provides for carrying out multiple adsorption cycles. During the washing step, the adsorbent material is regenerated by running water inside the device, to obtain the cleaning and thus the reactivation of the adsorbent material.

In one embodiment, the washing step is carried out by connecting the device to the water supply network. Alternatively, in the case of a treatment intended for the removal of metal species, the regeneration of the adsorbent material is appropriately obtained by the use of a flow of deionized water inside the device.

The following examples demonstrate that the device and the method of the present invention allow advantageously to remove from the treated wine and from other vegetable beverages not only the agents that cause so-called protein instability or turbidity (i.e. so-called "pathogenesis-related proteins" generally present in wine in concentrations ranging from a few tens to hundreds of mg/l, which mainly comprise chitinase and thaumatin-like proteins ("TLPs")), but also, in a single treatment, the causative agents of so-called oxidative instability, mainly the transition metals: Cu, Fe, Mn, which act as catalysts determining the color variations observed in wine and in other vegetable beverages after a certain period of time.

A further advantage of the device and of the method of the present invention consists in a substantial reduction of the treatment times and in a clear simplification of the technology, as it is no longer necessary to carry out those operations of decanting and filtration that were instead necessary with the static systems of the prior art.

Last but not least, the device and the method of the present invention allow a reduction in the production of waste, since immobilized adsorbent material is used, which, among other things, may be easily regenerated, thus making several subsequent uses possible.

The following examples are provided for illustrative purposes and do not limit the scope of the invention as defined in the accompanying claims.

EXAMPLES

Materials and Methods

The effectiveness of the adsorbent material and the device of the invention was tested on different varieties of white wines obtained by an industrial process and coming from different wineries, as well as on synthetic wine solutions (composition: tartaric acid 5 g/l, ethanol 12% (v/v) in deionized water, pH 3.6) to which have been added known concentrations of the metals Cu, Fe.

Figure 2:
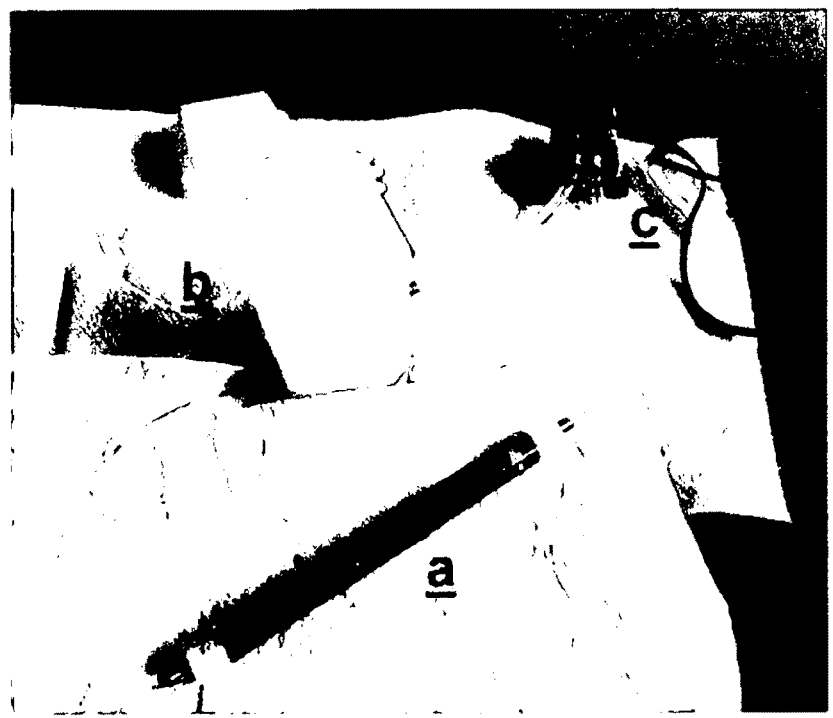
FIG. 2 is a photograph of a column.

The method of adsorption of compounds such as "PR" type proteins and Cu, Fe metals, in continuous flow conditions, was conducted on a prototype of the device (FIG. 2), consisting of: a) glass column filled with mesoporous adsorbent material; b) graduated bottle for containing the wines or synthetic wine solutions; c) volumetric feed pump. The column, the photographic image of which is reproduced in FIG. 2, is a glass tube, 75 mm in length, with an internal diameter of 14 mm and a glass wall thickness of 1 mm. The prototype was fed by a volumetric pump with variable power supply in the range of 1.25-12 Volts, allowing the volumetric flow to be adjusted. This flow has been optimized to obtain a constant flow rate of 1.28 ml/sec at ambient temperature.

Figure 3:
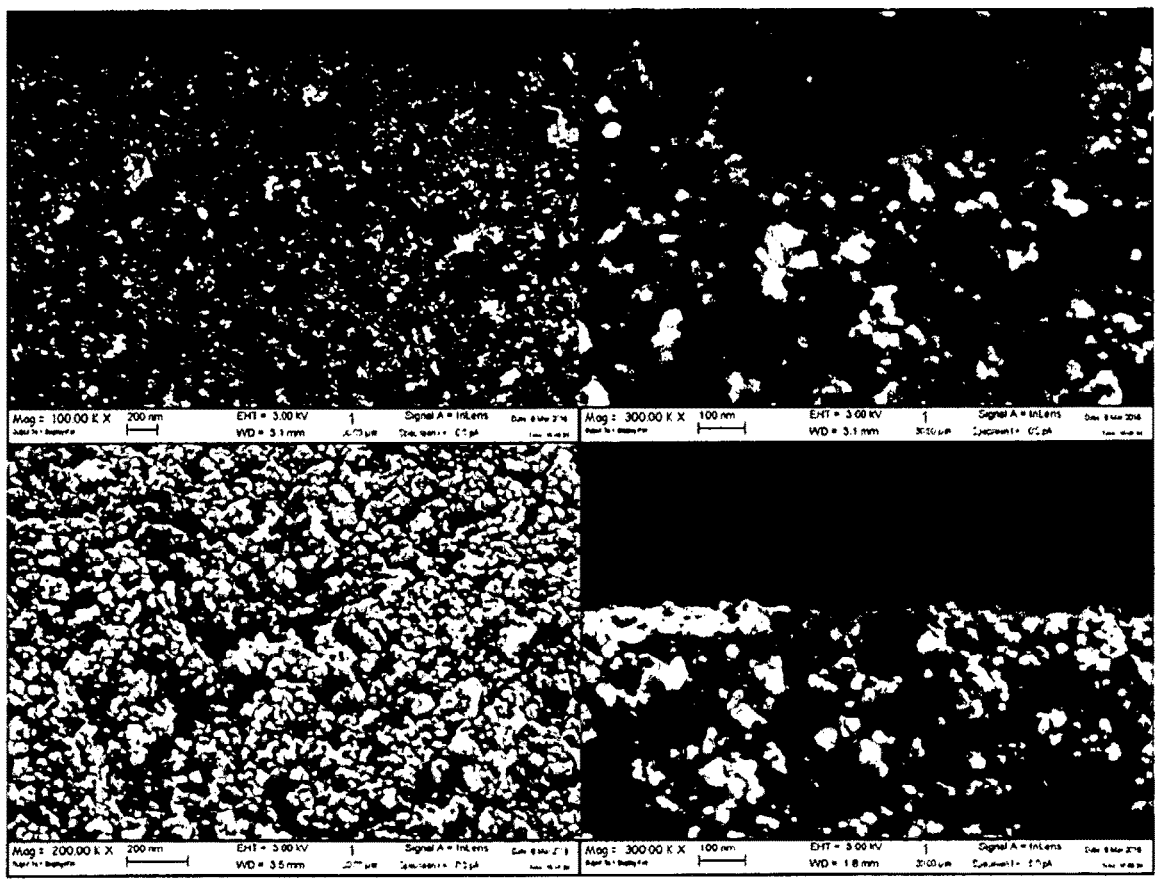
FIG. 3 is SEM images of a sintering structure.

The sintered material was obtained through a treatment in a ventilated furnace equipped with a temperature control and programming system. The programmed temperature ramp provided for a multi-step heating system with an increase in the range: T=ambient–550° C. The material obtained was analyzed with the SEM/EDX system, in order to obtain an image of the sintering structure, and to verify the absence of contaminants and organic residues. FIG. 3 shows SEM images of the sintering structure obtained by heat treatment of $TiO_2$ nanoparticles. Based on the specific area characteristics obtained for the sintered material, materials were prepared to provide an active surface of 0.45 $m^2$, 2.25 $m^2$, 4.50 $m^2$, 9.00 $m^2$, 18.00 $m^2$, respectively, for the treatment of volumes of 50 ml in the different case studies. By way of example, the results are reported of experiments conducted on Chardonnay and Moscato wines and on synthetic wine solutions to which known concentrations of iron and copper ions ($Fe^{2+}$: 2 mg/l; $Cu^{2+}$: 1 mg/l) were added. The following parameters were measured: protein composition, metal content, phenolic component composition, organic acid composition, stability tests.

The absence of contaminants was also evaluated, and the treated samples were subjected to accelerated aging tests, consisting of heat stress tests to accelerate oxidation (T=35° C., 5 days' exposure), and heat stability tests to determine protein stability (T=80° C., 30 minutes' exposure and subsequent cooling to ambient T, to assess any side effects due to contact with the adsorbent material.

Results

Figure 4:
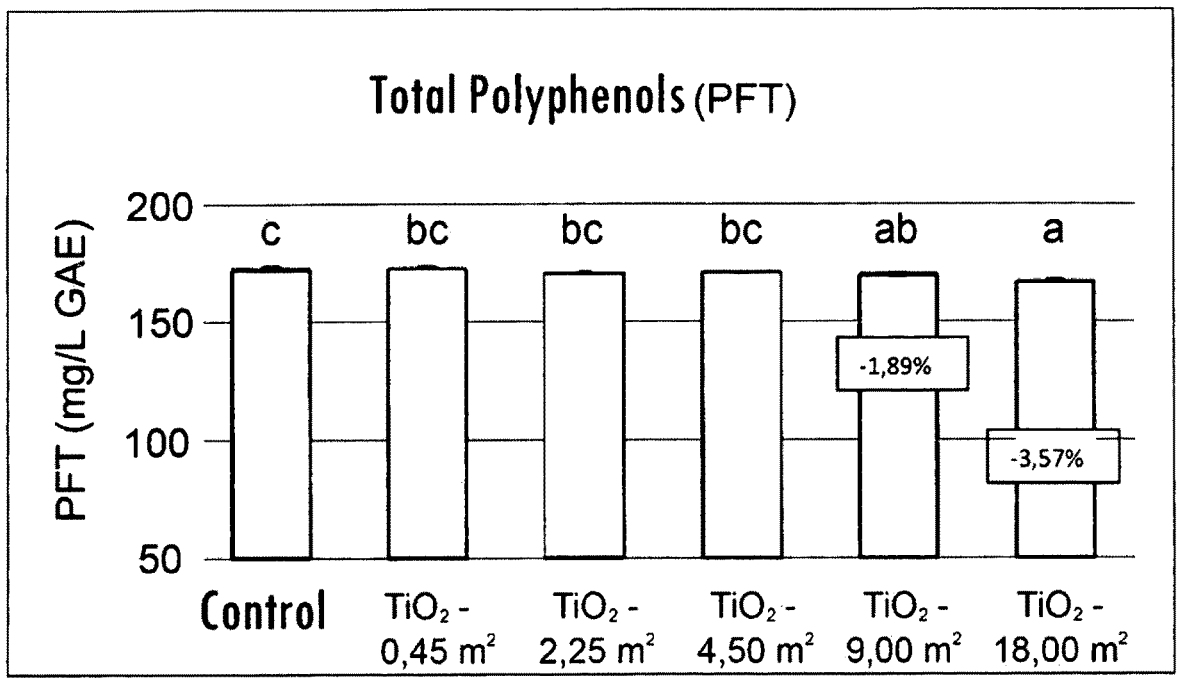
FIG. 4 is graph showing polyphenol content.

The experiments carried out on different varieties of white wines demonstrated the stability of oenological quality parameters such as pH (Table 1), polyphenol content (FIG. 4), organic acid content (Table 2). In particular, FIG. 4 shows the concentration of total polyphenols in a white wine—Chardonnay variety, exposed to different quantities of mesoporous TiO2. A modest decrease in polyphenol content (<4%) was observed only for elevated exposed surfaces (>9.00 $m^2$). The results were expressed in mg/l of gallic acid. Significant differences are identified with different letters at 95% confidence level.

Figure 5:
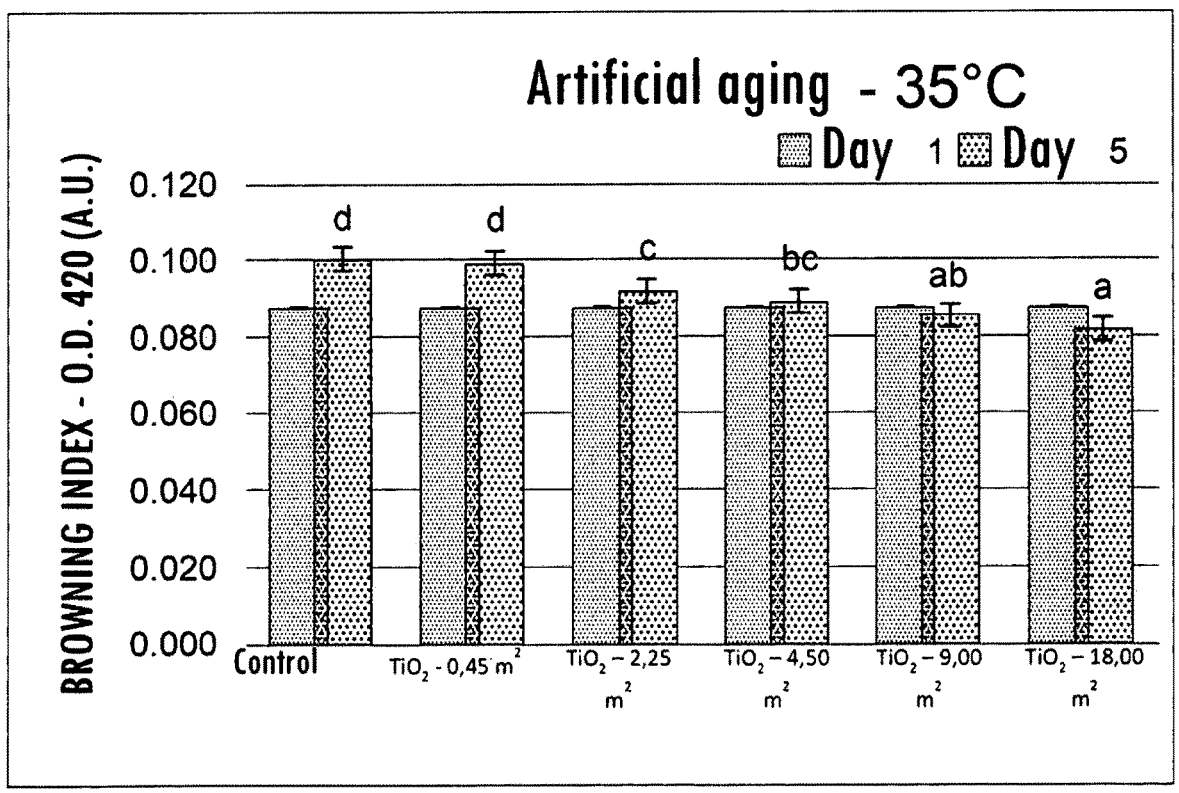
FIG. 5 is a graph showing browning index.

Moreover, the mesoporous adsorbent material showed an inhibitory activity (dose-dependent) against oxidation of wines subjected to accelerated aging tests. FIG. 5 shows the results of a test wherein Chardonnay variety wine is exposed to different quantities of mesoporous $TiO_2$ and subjected to an accelerated aging test at a temperature of 35° C., in static mode. As the active area increases, a protective effect is observed, as indicated by the decrease in the browning index (O.D. 420 nm). Significant differences are identified with different letters at 95% confidence level.

TABLE 1

Verification of pH stability on Chardonnay wine treated in different adsorbent material/wine ratios.

| $TiO_2$ -Active surface/50 ml wine | pH wine |
|---|---|
| Control | $2.93^a$ |
| 0.45 $m^2$ | $2.91^a$ |
| 2.25 $m^2$ | $2.94^a$ |
| 4.50 $m^2$ | $2.93^a$ |
| 9.00 $m^2$ | $2.93^a$ |
| 18.0 $m^2$ | $2.92^a$ |

[a]Insignificant differences at a 95% confidence level.

TABLE 2

Concentration of the main organic acids in the wine, determined with the HPLC method in Chardonnay wine before (control) and after treatment in the device. Insignificant differences at a 95% confidence level.

| | Citric acid | | Tartaric acid | | Malic acid | | Succinic acid | | Lactic acid | | Acetic acid | |
|---|---|---|---|---|---|---|---|---|---|---|---|---|
| SAMPLE | g/L | SD | g/L | SD | g/L | SD | g/L | SD | g/L | SD | g/L | SD |
| Control | 0.28 | 0.01 | 5.37 | 0.07 | 2.53 | 0.04 | 2.18 | 0.04 | 0.10 | 0.00 | 0.04 | 0.02 |
| $TiO_2$ 18.00 $m^2$/50 ml | 0.27 | 0.00 | 5.30 | 0.02 | 2.46 | 0.09 | 2.11 | 0.04 | 0.10 | 0.00 | 0.02 | 0.01 |

Figure 6:
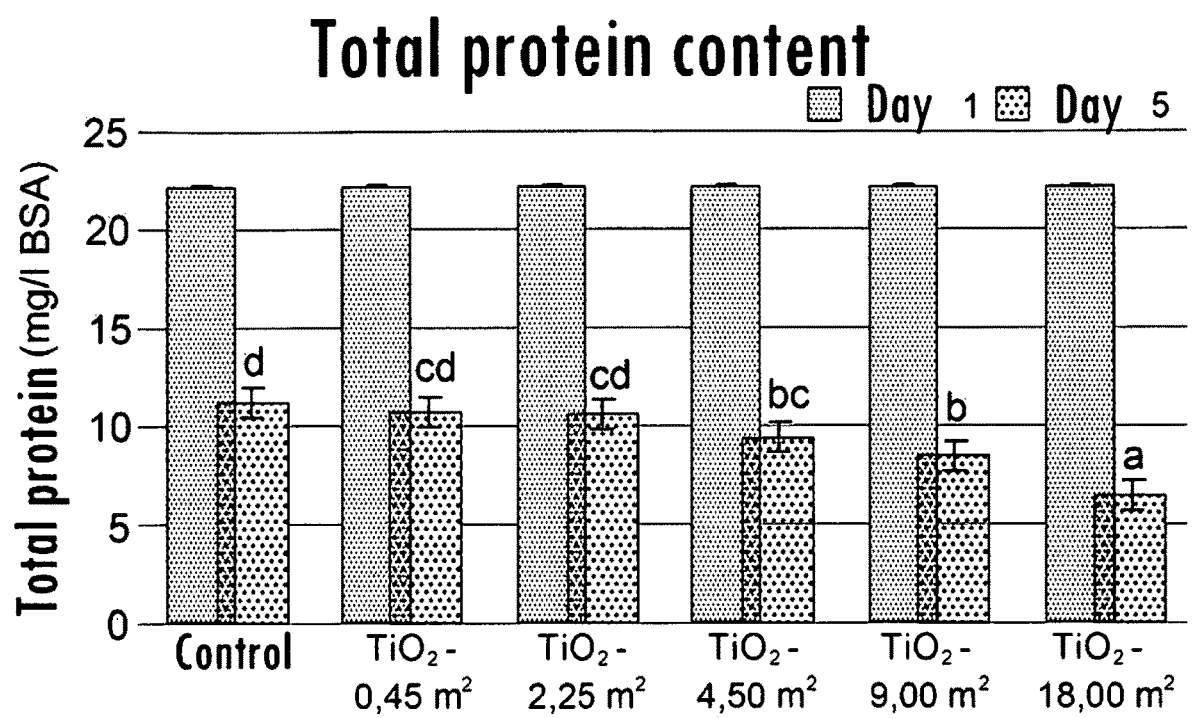
FIG. 6 is a graph showing total protein.

As far as protein concentration is concerned, the contact of Chardonnay variety wine with mesoporous adsorbent material in static mode produced a decrease in the total protein content, of an amount proportional to the increase in the active surface placed in contact with the wine during treatment: reductions of 4.5% (0.45 $m^2$/50 ml), 4.5% (2.25 $m^2$/50 ml), 15.3% (4.50 $m^2$/50 ml), 25.2% (9.00 $m^2$/50 ml), and 42.3% (18.00 $m^2$/50 ml) were observed, respectively. The absence of flow and stirring produced the stabilization of the wine only after a period of 5 days (FIG. 6). More specifically, FIG. 6 shows the reduction in the concentration of total proteins in Chardonnay variety wine, exposure to mesoporous material in static mode. Significant differences are identified with different letters at 95% confidence level.

The flow stabilization tests were carried out on Moscato variety wine, using an active surface of mesoporous material equal to 18.00 $m^2$/50 ml.

Figure 7:
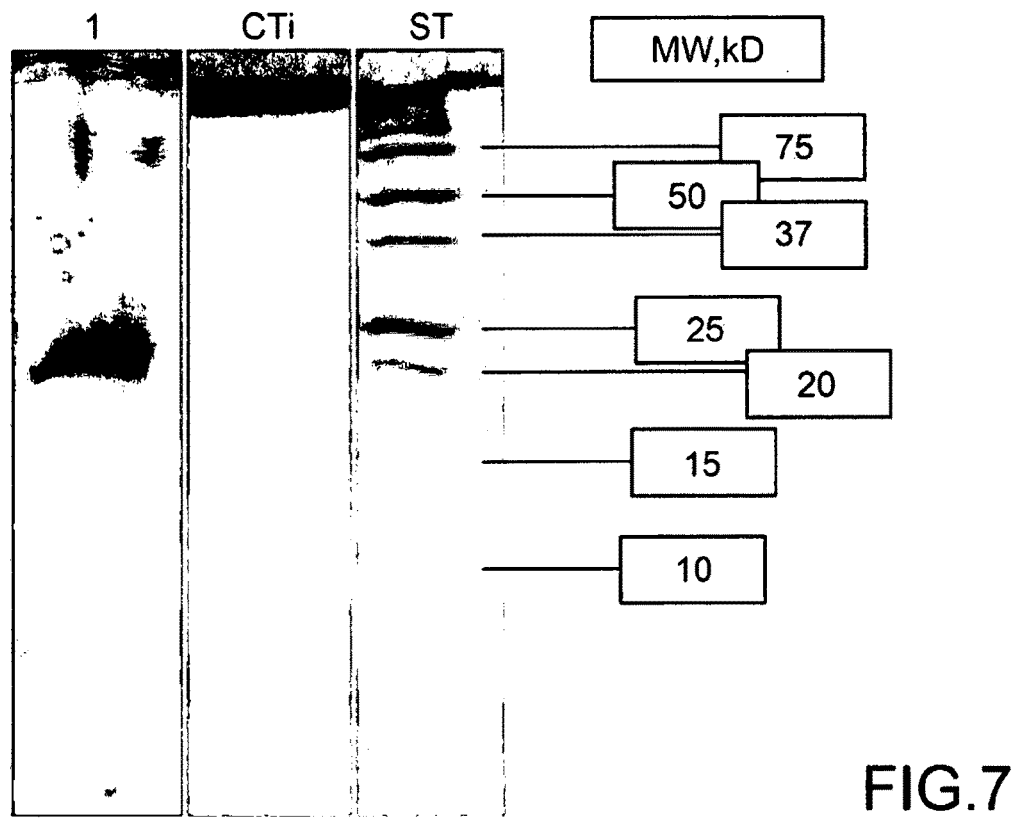
FIG. 7 is an SDS-page analysis graphic.

Since the wine was stable to the thermal stress induced by the heat stability test, the SDS-PAGE analysis on the protein components was carried out. The results show that the treatment effectively removed the low molecular weight protein fractions (<35 MkDa), identified as proteins with a thaumatin-like protein (TLP) structure and responsible for the phenomena of instability (FIG. 7). More specifically, FIG. 7 shows the SDS-page analysis conducted on Muscat variety wine treated with the device of the invention. Legend: Line 1—control; Line CTI—wine treated with mesoporous material 18.00 m²/50 ml wine; Line ST. standard reference. The bands of interest have been highlighted with Coomassie Blue dye.

In conclusion, tests for the removal of metal species capable of catalyzing the oxidative phenomena in beverages of vegetable origin were carried out by applying the treatment in the device to various types of matrices; by way of example, the results of the experiment that involved the treatment of a synthetic wine, to which known concentrations of $Cu^{2+}$ and $Fe^+$ ions were added, are reported (Table 3). The results showed a strong adsorbent power of these metals by the mesoporous nanostructured material, with removal of 62.5% of $Fe^+$ ions and 48% of $Cu^+$ ions.

TABLE 3

ICP-OES analysis to verify the concentration of Cu and Fe metals, added in known concentrations to synthetic wine and treated on mesoporous material.

| Metal | Control (ppm) | $TiO_2$- 18.00 m²/50 ml (ppm) |
|---|---|---|
| $Cu^{2+}$ | 0.928 | 0.388 |
| $Fe^{2+}$ | 1.9995 | 0.1445 |

The invention claimed is:

1. A device for stabilizing wine and other vegetable beverages, the device comprising:
    a tubular container filled internally at least partly with particles of support material coated with a layer of mesoporous nanostructured adsorbent material comprising titanium oxide, the layer having a thickness between 10 and 25 µm and the mesoporous nanostructured adsorbent material having pores of size between 15 and 50 nm, BET surface area between 90 and 100 m²/g and absorbent volume of the pores between 0.4 and 0.5 cm³/g;
    an inlet conduit and an outlet conduit for a beverage to be stabilized, respectively positioned at the two ends of the tubular container, said inlet conduit and said outlet conduit being in fluid communication with the internal volume of the tubular container;
    a first closure element and a second closure element, respectively positioned at the two ends of the tubular container, said inlet and outlet conduits passing through the first and second closure elements, wherein the first and the second closure elements are adapted to occlude a respective end section of the tubular container and to prevent escaping of the mesoporous nanostructured adsorbent material contained therein; and
    a first filtering element positioned in an outlet section of the inlet conduit into the tubular container and a second filtering element positioned in an inlet section of the outlet conduit from the tubular container, the first and the second filtering elements having pores of dimensions adapted to retain inside the tubular container the particles of support material coated with the layer of mesoporous nanostructured adsorbent material.

2. The device according to claim 1, wherein the particles of support material are glass spheres or flakes, having size ranging from 1 to 10 mm.

3. The device according to claim 1, wherein the tubular container is made of stainless steel, glass or food-grade plastics.

4. The device according to claim 1, further comprising respective sealing gaskets applied at an interface between the tubular container and the first and second closure elements.

5. The device according to claim 1, wherein the inlet conduit and the outlet conduit are mutually connected in a closed loop.

6. A method for adsorbing proteins and/or metals from wine or other vegetable beverages, the method comprising at least one adsorption step wherein wine or other vegetable beverages is/are made to flow through a device comprising:
    a tubular container filled internally at least partly with particles of support material coated with a layer of mesoporous nanostructured adsorbent material comprising titanium oxide, the layer having a thickness between 10 and 25 µm and the mesoporous nanostructured adsorbent material having pores of size between 15 and 50 nm, BET surface area between 90 and 100 m²/g and absorbent volume of the pores between 0.4 and 0.5 cm³/g;
    an inlet conduit and an outlet conduit for a beverage to be stabilized, respectively positioned at the two ends of the tubular container, said inlet conduit and said outlet conduit being in fluid communication with the internal volume of the tubular container;
    a first closure element and a second closure element, respectively positioned at the two ends of the tubular container, said inlet and outlet conduits passing through the first and second closure elements, wherein the first and the second closure elements are adapted to occlude a respective end section of the tubular container and to prevent escaping of the mesoporous nanostructured adsorbent material contained therein; and
    a first filtering element positioned in an outlet section of the inlet conduit into the tubular container and a second filtering element positioned in an inlet section of the outlet conduit from the tubular container, the first and the second filtering elements having pores of dimensions adapted to retain inside the tubular container the particles of support material coated with the layer of mesoporous nanostructured adsorbent material,
to obtain adsorption of the of proteins and/or metals on the mesoporous nanostructured adsorbent material.

7. The method according to claim 6, further comprising one or more additional adsorption steps, wherein wine or other vegetable beverages is/are recirculated through the device.

8. The method according to claim 6, further comprising a washing step of the mesoporous nanostructured adsorbent material.

9. The method according to claim 8, wherein the washing step is carried out at the end of one or more adsorption steps or between two successive adsorption steps.

10. The method according to claim 6, wherein the proteins comprise chitinase and thaumatin-like proteins and the metals comprise copper, iron and/or manganese.

* * * * *